Sept. 25, 1934.     D. E. LINDQUIST     1,974,963
APPARATUS FOR RESHAPING DEFORMED PIPE ENDS
Filed June 2, 1933
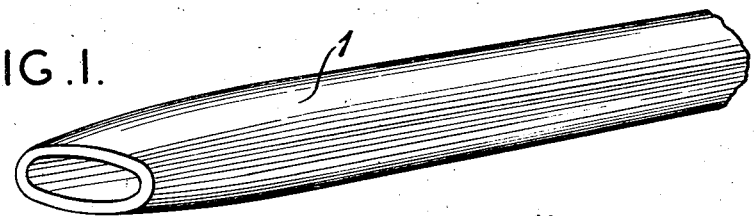
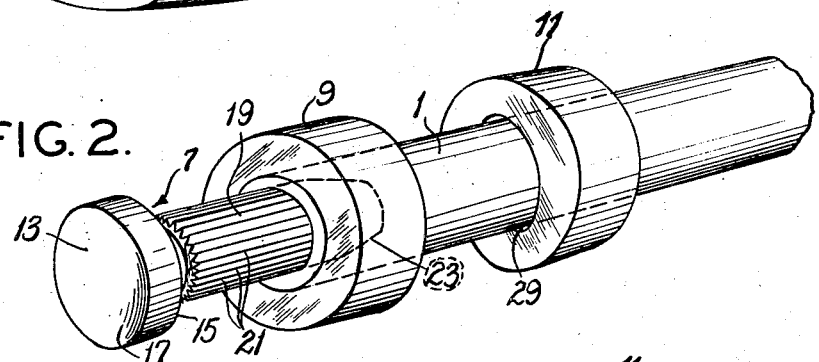
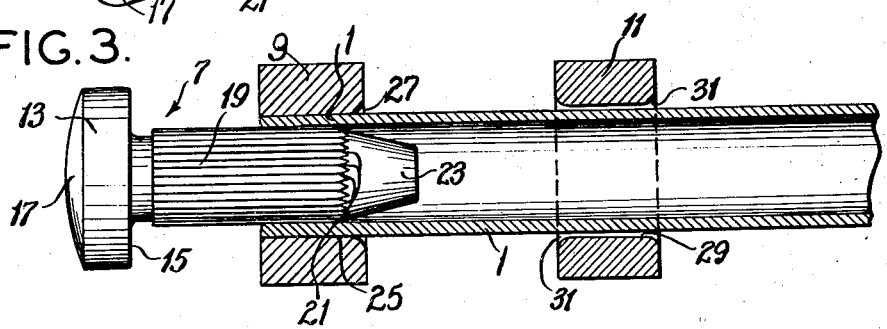
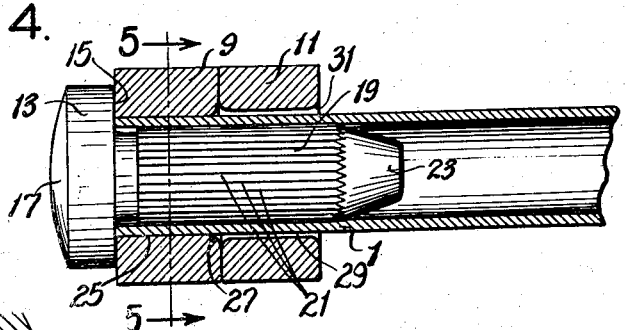
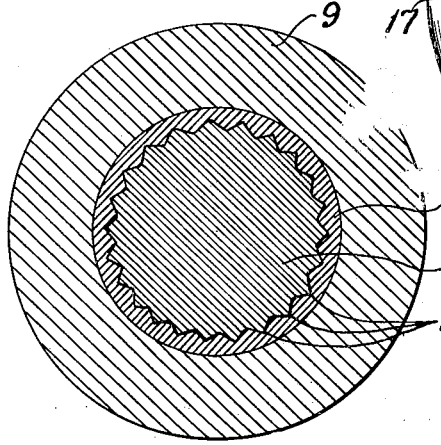

Patented Sept. 25, 1934

1,974,963

UNITED STATES PATENT OFFICE 1,974,963

APPARATUS FOR RESHAPING DEFORMED PIPE ENDS

David E. Lindquist, Port Huron, Mich., assignor to Mueller Brass Co., Port Huron, Mich., a corporation of Michigan Application June 2, 1933, Serial No. 674,009

3 Claims. (Cl. 153—79)

This invention relates to apparatus for reshaping deformed pipe ends, and with regard to certain more specific features, to apparatus for reshaping deformed pipe ends to a condition of true roundness and regularity.

Among the several objects of the invention may be noted the provision of apparatus of the class described which effects the desired reshaping without straining or otherwise harming the metal of the pipe to the extent that its utility is impaired; apparatus which effects the desired result wtihout requiring excessively hard blows; apparatus of the class described which is particularly adapted for use with pipe that was originally of too great wall thickness, or of non-uniform wall thickness; and the provision of apparatus of the class described which is relatively simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is an isometric view of a deformed pipe end, of a type which is suitable for reshaping according to the use of the present invention;

Fig. 2 is an isometric view of the apparatus of the present invention as it is applied to a pipe of the type shown in Fig. 1;

Fig. 3 is a longitudinal section of the assembly illustrated in Fig. 2;

Fig. 4 is a longitudinal section similar to Fig. 3, but illustrating an advanced stage in the use of the present invention; and, Fig. 5 is a cross section taken substantially along line 5—5 of Fig. 4.

Similar reference characters indicate corresponding parts throughout the several views of the drawing.

This invention constitutes an improvement over the apparatus shown in Charles A. Hill Patent No. 1,783,088, dated November 25, 1930, for Method of and apparatus for reshaping deformed pipe ends. The invention finds its principal use in conjunction with the manufacture of joints of the type illustrated in Charles A. Hill Patent No. 1,770,852, dated July 15, 1930, wherein a pipe and fitting are telescoped together and solder is spread as a sealing material throughout the regions of telescoping contact by capillary action to seal the joint. It will be evident that for properly setting up or making this type of joint, it is desirable that the exterior surface of the pipe end be accurate both as to diameter, true circularity, and true cylindricity. But pipe of the type to which the Hill type of joint is particularly adapted is usually thin-walled, relatively soft, and subject to deformation upon shipping or cutting, so that by the time it is to be telescoped into the fitting to make the joint, its formation is so irregular that at times it cannot be introduced into the fitting at all, and, more frequently, it does not space properly to enable the effective distribution of the molten solder throughout the joint by capillary action. Further, unless accurate methods are utilized in the manufacture of the pipe, occasional regions occur in which the wall thickness of the pipe is excessive, either by reason of an increased exterior diameter or a decreased interior diameter; or, the pipe may even be of non-uniform wall thickness around its periphery.

In the said Hill Patent 1,783,088, a normally satisfactory method of reshaping such deformed pipe ends to true cylindricity is shown. There are some conditions, however, in which this method is somewhat unsatisfactory, or at least can be improved upon, such as, for example, when the pipe has initially been poorly drawn whereby its wall-thickness is excessive with respect to the apparatus of the Hill Patent 1,783,088 provided, or is non-uniform. The Hill method and apparatus are unsatisfactory with the former type of pipe end because in reshaping, actual compression of the pipe metal is necessary, since the ring and plug members provided are sized to a certain wall-thickness, and when the wall-thickness exceeds this standard, there is no place for the excess metal to flow as reshaping occurs. This results in jams of the apparatus, wherein, even if it has been possible to drive the reshaping elements to position, it is substantially impossible to remove them from such position without re-deforming the pipe. Or, in the event that the wall-thickness is not uniform, flowing of the excess metal at one side of the pipe around the periphery of the pipe to the other side is necessary, and this introduces strains which weaken the pipe end and otherwise adversely affect it, in addition to making the task of reshaping considerably more difficult (the blows must be delivered with much greater force).

The apparatus of the present invention comprises, like the said Hill Patent 1,783,088, a plug or entering member 7, a shaping ring 9, and a knock-off ring 11. The plug 7 carries a head 13 which presents, on its under side, a plane abutment surface 15, while on its other side the head 13 is rounded as at numeral 17, to permit the most advantageous application of blows thereto. The present invention differs primarily from the said Hill Patent 1,783,088 in that the shank 19 thereof, the maximum diameter of which is substantially of the same diameter as the desired interior diameter of the deformed pipe, is longitudinally grooved or corrugated, as indicated at numeral 21, the individual corrugations preferably having sharp edges so that they will work a channel into the metal of the pipe as described hereinafter. The front end of the shank 19 is tapered, as at numeral 23.

The forming or shaping ring 9 is preferably heavy enough to stand considerable hammering without deforming. Its central opening 25 is accurately machined to true cylindricity, and to the exact diameter that it is desired to bring the pipe to. On one face of the ring, the central opening is preferably slightly beveled, as indicated at numeral 27, to facilitate application of the ring to a deformed pipe end.

The knock-off ring 11 is similar in general appearance to the forming ring 9, having a central opening 29. The opening 29, however, is made somewhat larger than the intended diameter of the pipe, and is beveled upon both sides, as at numerals 31. This ring, in operation, is applied to and slides freely upon a pipe of the exterior diameter it is desired to use.

The application of the apparatus to reshape a deformed pipe end is as follows:

First, the knock-off ring 11 is slipped over the deformed pipe end 1. It may be necessary to apply a few blows to the ring 11 to do this, but such blows are not harmful in view of the later straightening operation. As soon as the ring 11 slips to the underformed part of the pipe 1, it will be found to freely move or slide thereon.

Second, the forming ring 9 is applied in the same manner, with the bevel edge 27 advancing; again, it may be necessary to apply a few blows to position the ring 9 on the pipe 1. This ring, which usually remains tight on the pipe 1, is preferably driven on the pipe until its rearward face is in line with the end of the pipe (see Figs. 2 and 3).

Third, the plug 7 is driven into the pipe end, the conical point 23 advancing, by means of blows on the head 13. As this driving action takes place, it causes the pipe to slowly reshape itself to fit to the outer periphery of the plug shank 19 (without, however, following the corrugations 21). As this takes place, the corrugations 21 bite into the excessively thick walls of the pipe, and thus the plug is approximately centered without causing a peripheral flow of the pipe metal or any undue strain introduction, while providing for the flow of the excess metal into the troughs of the corrugations. The plug 7 is driven until the head 13 abuts the end of the pipe 1, which has previously been squared such as by cutting it in a mitre box, and the rear face of the forming ring 9. The condition now is that all deformities of the pipe which comprised a depression of a part of the pipe wall inwardly from its usual position, or a bulge outwardly from normal roundness have been corrected by the expanding action of the driven plug against the confining action of the forming ring 9.

Fourth, and finally, the reshaping apparatus is removed from the pipe end without re-deforming it by a succession of blows delivered by axially moving the knock-off ring 11 on the pipe 1 against the face of the forming ring 9. The forming ring 9, abutting the head 13 of the plug 7, in turn drives the plug 7 from the pipe. All of this is done by blows, the force of which is evenly distributed about the periphery of the ring 9, and hence any re-deformation of the pipe end is avoided.

The reshaped pipe end is exteriorly truly cylindrical, and accurately sized to the desired diameter. Interiorly, it may show grooves produced by the corrugations 21, but these are of no consequence as the interior surface of the pipe does not play any part in the making of the desired joint.

While the invention has been described principally in connection with its use as a reshaping means for deformed pipe ends, it will be apparent that it is also useful for reshaping (say to an increased or decreased diameter) the ends of pipes which are in no sense of the word deformed. For example, it may be desired to attach a one inch pipe to a one and one-quarter inch fitting. By using the reshaping apparatus herein described, as designed for one and one-quarter inch pipe, the end of the one inch pipe may be evenly expanded to fit in the one and one-quarter inch fitting.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. Apparatus for effecting the reshaping of pipe ends comprising a pair of ring members of different internal diameter, one of which rings is adapted to fit tightly around the end of the pipe in its desired final shape and the other of which rings is loosely slidable along said pipe, and an entering member whose cross-section is substantially the desired internal cross-section of the pipe, said entering member being provided with longitudinal corrugations.

2. Apparatus for effecting the reshaping of pipe ends comprising a pair of ring members of different internal diameter, one of which rings is adapted to fit tightly around the end of the pipe in its desired final shape and the other of which rings is loosely slidable along said pipe, and an entering member whose cross-section is substantially the desired internal cross-section of the pipe, said entering member being provided with longitudinal corrugations, said corrugations being sufficiently sharp to bite into the metal of the pipe to be reshaped.

3. Apparatus for effecting the reshaping of pipe ends comprising a forming ring, the internal diameter of which is equal to the desired external diameter of the pipe end to be reshaped, a knock-off ring, the internal diameter of which is in excess of the desired external diameter of the pipe end to be reshaped, and a plug having a head and a shank, the diameter of the shank of the plug being substantially equal to the desired internal diameter of the pipe end to be reshaped, said shank being provided with longitudinal corrugations extending the length thereof, said corrugations being adapted to compensate, in the reshaping operation, for excessive or uneven thickness in the walls of said pipe end.

DAVID E. LINDQUIST.